United States Patent [19]

Carraway

[11] Patent Number: 5,234,368
[45] Date of Patent: Aug. 10, 1993

[54] TURKEY CALL HAVING RESONANT CHAMBER

[76] Inventor: Cleon P. Carraway, 4921 Kendall Rd., Baytown, Tex. 77520

[21] Appl. No.: 867,129

[22] Filed: Apr. 10, 1992

[51] Int. Cl.⁵ .................. A63H 33/40; A63H 5/00
[52] U.S. Cl. .................. 446/202; 446/397; 446/209
[58] Field of Search .......... 446/397, 408, 416, 176, 446/200, 202, 203, 204, 205, 206, 207, 208, 209, 213

[56] References Cited

U.S. PATENT DOCUMENTS

| | | | |
|---|---|---|---|
| 709,728 | 9/1902 | Waldbjorn | 446/207 |
| 728,083 | 5/1903 | Childers | 446/209 |
| 874,526 | 12/1907 | McLaughlin et al. | 446/209 X |
| 1,118,223 | 11/1914 | Parmeter | 446/416 |
| 1,241,822 | 10/1917 | Cooney | 446/202 X |
| 3,670,452 | 6/1972 | Turner | 446/202 |
| 4,642,065 | 2/1987 | Whedon et al. | 446/209 |
| 4,950,201 | 8/1990 | Sceery | 446/397 X |
| 4,997,402 | 3/1991 | Blease | 446/202 |

OTHER PUBLICATIONS

"Free Ka" The New Yorker, Jul. 11, 1970, pp. 20, 21.

Midwest Turkey Call Supply catalog, 1992 Spring edition, pp. 8-21.

J. Casada, "The Wandrous Wingbone", *Turkey and Turkey Hunting*, Mar. 1992, pp. 12-18.

*Primary Examiner*—Robert A. Hafer
*Assistant Examiner*—D. Neal Muir
*Attorney, Agent, or Firm*—Harrison & Egbert

[57] ABSTRACT

A turkey call having a housing with a first end and a second end, and a tubular flexible liner with an open end extending outwardly from the first end of the housing. The first end of the housing has a smaller diameter than the second end of the housing. The liner has a bell end opposite the open end. The bell end extends inwardly of the second end of the housing. The liner is affixed within the housing such that an air space is formed between the housing and the liner. The liner includes a first tapered portion which extends outwardly from the open end of the housing and a second straight portion which extends from the first tapered portion to the bell end. The second straight portion has a diameter greater than the first tapered portion. The air space is formed between the second straight portion and an inner surface of the housing.

9 Claims, 1 Drawing Sheet

TURKEY CALL HAVING RESONANT CHAMBER

TECHNICAL

The present invention relates to turkey calls, in general. More particularly, the present invention relates to turkey calls that are actuated by a person's breath.

BACKGROUND ART

The technology of turkey calls is indeed widespread and pervasive. Turkey calls have been used throughout the years so as to summon wild turkeys into either bow or rifle range. The concept of the turkey call is that the sound of a turkey can be duplicated by mechanical or pneumatic means. When a turkey sound is artificially created, then the wild turkeys are likely to respond to the sound by approaching the sound or otherwise moving from cover. It is generally the goal of all turkey calls to replicate the sound of a turkey as closely as possible.

There are three specific categories of turkey calls: friction-type calls, latex calls, and wingbone-type calls. Conventionally, the friction-type calls utilize a mechanical action so as to duplicate the sound of a turkey. For example, one type of friction-type call employs the rubbing of a plastic striker against a surface of slate. Other types of friction-type calls require the rubbing of one type of wood against another type of wood. This loud sound produced by the rubbing of the surfaces is intended to duplicate the sound of a turkey. Unfortunately, friction-type calls are normally quite bulky. They are generally inconvenient to carry during a hunting expedition. The friction-type calls do not function properly when the hunting conditions are wet or very humid. Many times, the friction-type call is detrimental to the hunter's intentions because the friction-type call often squeaks inadvertently. This causes the wild turkey to hear the hunter's approach and enables the turkey to escape from the hunter. It is also important to realize that friction-type calls have the disadvantage of producing, generally, the same sound all the time. Since the friction-type calls produce a constant type of call, they do not effectively replicate the varied sounds of a wild turkey.

Latex calls are normally configured in metal and plastic so as to fit within the mouth of the hunter. By breathing along a latex surface, a turkey-type sound is produced. Since the latex calls are carried in the mouth, they can be generally uncomfortable, can cause a gagging sensation, and can cause potential choking hazards. Latex calls are very hard to learn. It often takes weeks or months to properly master a latex call so as to duplicate the sound of a turkey.

The wingbone-type call is generally considered the type of call which most closely replicates the turkey's sound. The wingbone-type call has been used in turkey calling since prehistoric times. Archeologists have documented many instances of what appear to be rudimentary calling devices left by American Indians. The Indians taught early frontiersmen how to use the wingbone call. By the time turkey hunting articles began to appear in 19th century periodicals, many people were familiar with the wingbone. The wingbone call is usually assembled by taking the smaller bone from the wing of a wild hen turkey: the radius of the forearm. The bone is thoroughly cleaned of all of its marrow. After cutting off nearly one-half inch from each end of the bone, the ends are made quite smooth with a file. The round end of the bone is packed and glued into the end of a piece of reed cane joint approximately two inches long and three/eighths inch in diameter. Another joint of cane is placed on the piece and glued together. That joint of cane can be cut until the right tone is produced. Some use the other two larger bones from the wing instead of cane. The flat end of the bone is used as the mouthpiece. Although the wingbone call has historical significance, it has generally been considered very difficult to learn and is seldom used in modern turkey hunting.

Usually, callers learn to "kiss" the wingbone in order to make reasonable yelps. The sounds are obtained by pulling in air while properly placing the lips around the wingbone, much like a clucker. The wingbone often yields unrivaled kee-kee runs, but rendering them properly is a measure of only the truly accomplished turkey hunter. It is very rare where the wingbone call user is able to produce thunderous, realistic gobbles. In addition, wingbone-type calls can have a great deal of variance between the individual calls due to the large variation in bone sizes. After thorough analysis, it was found that the wingbone-type call is not raspy enough to exactly duplicate the sounds of a turkey.

It is an object of the present invention to provide a turkey call that more closely replicates the sound of a turkey.

It is another object of the present invention to provide a wingbone-type call that is relatively easy to use.

It is another object of the present invention to provide a turkey call that is relatively inexpensive, easy to manufacture, relatively compact, and very light weight.

It is still a further object of the present invention to provide a turkey call that can produce a wide variety of turkey sounds.

It is an additional advantage of the present invention to provide a turkey call that will not wear out and can be used in various weather conditions.

These and other objects and advantages of the present invention will become apparent from a reading of the attached specification and appended claims.

SUMMARY OF THE INVENTION

The present invention is a turkey call that comprises a housing and a flexible lining affixed within the housing. The flexible lining is positioned within the housing such that an air space is formed between the tubular housing and the lining. The lining has an open end adjacent to the first end of the tubular housing.

The housing has the second end opposite the first end. The first end has a smaller diameter than the second end. The housing has a tubular tapered configuration which tapers between the ends. The tubular housing is comprised of a generally rigid polypropylene material.

The flexible lining has the open end extending outwardly from the first end of the tubular housing. This flexible lining has a material thickness of less than 1/16 of an inch. The flexible lining is a generally tapered tubular member. This flexible lining has a bell end opposite to the open end. The bell end is affixed to the housing. The bell end has a diameter greater than the diameter of the open end. The bell end is adhesively fastened to an inner surface of the housing. The bell end is positioned within the tubular housing so as to be within the housing distal the second end of the housing.

The flexible lining has a first tapered portion extending between the open end to within the housing, and a second straight portion extending from the first tapered end to the bell end. The second straight portion has a diameter greater than the first tapered portion. The air space is formed between the second straight portion and an inner surface of the housing. The bell end is tapered from the end of the second straight portion opposite the first tapered portion. The bell end has an outer surface which corresponds to and is in juxtaposition with an inner surface of the housing. The flexible liner is made of a polyethylene material.

DETAILED DESCRIPTION OF THE INVENTION

Figure 1:
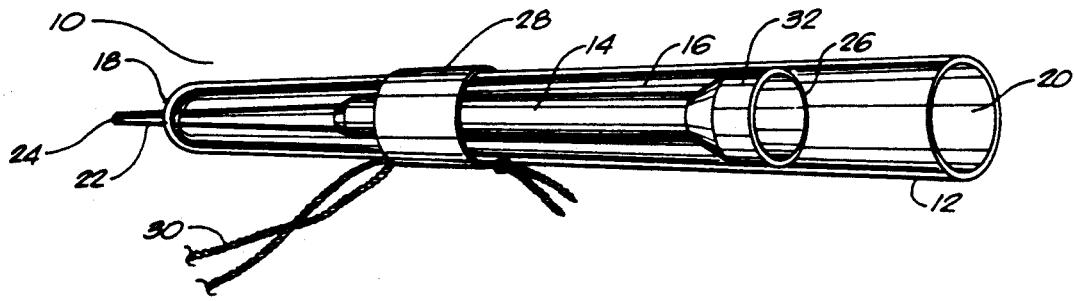
FIG. 1 is a perspective view, in clear illustration, of the turkey call in accordance with the preferred embodiment of th present invention.

Referring to FIG. 1, there is shown at 10 the turkey call in accordance with the preferred embodiment of the present invention. The turkey call 10 comprises a housing 12 and a flexible liner 14. The flexible liner 14 is affixed within the housing 12. An air space 16 is formed between the exterior of the flexible liner 14 and the interior of the housing 12. The housing 12 has a first end 18 and a second end 20. The flexible liner 14 has a portion 22 which extends outwardly from the first end 18 of housing 12. The flexible liner has an open end 24 which is positioned on the portion 22 exterior of the first end 18 of housing 12.

The housing 12 is a tubular shell of polypropylene material. In the preferred embodiment of the present invention, the shell 12 has a thickness of approximately one-sixteen of an inch. It is important to note, however, that the dimensions recited herein should not be construed as a limitation of the present invention. The dimensions should only be considered for the purposes of describing what is considered to be the preferred embodiment of the present invention.

The shell 12 has a second end 20 which is open and has a diameter greater than the first end 18. As can be seen in FIG. 1, the bell end 26 of flexible liner 14 is positioned within the interior of housing 12 distal to the end 20. A polyethylene band 28 extends around the diameter of housing 12 so as to secure landyard 30 to the turkey call 10. The landyard 30 can extend around the hunter's neck during use. The band 28 and the landyard 30 can be removed, if desired, in accordance with the desires of the hunter.

The flexible liner 14 has open end 24 extending outwardly from the first end 18 of the tubular housing 12. In the preferred embodiment of the present invention, the flexible liner 14 is made of a polyethylene material having a thickness of less than 1/16 of an inch. It is believed, ideally, that the flexible liner 14 should have a thickness of 1/32 of an inch (or possibly less). The flexible liner 14 should be sufficiently thin so as to allow for a sufficient amount of vibration to occur within air space 16 in the housing 12. The reverberation of the flexible liner 14 enhances the ability of the turkey call 10 of the present invention to produce raspy turkey sounds. It can be seen that the flexible liner 14 is a generally tapered tubular member. The bell end 26 is opposite to the open end 24 on the flexible liner 14. The bell end 26 includes a surface 32 which is adhesively fastened to the inner surface of housing 12. It can also be seen that the bell end 26 has a diameter greater than the diameter of the open end 24.

Figure 2:
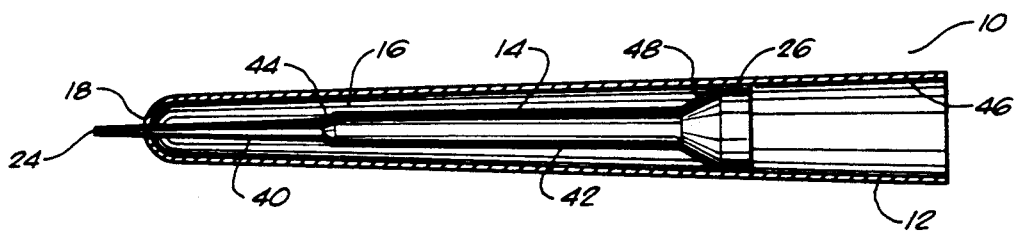
FIG. 2 is a cross-sectional view of the turkey call in accordance with the preferred embodiment of the present invention.

A cross-sectional view of the turkey call 10 is shown in FIG. 2. Most importantly, FIG. 2 shows how the flexible liner 14 is positioned within the housing 12. In particular, the flexible liner 14 is shown as having a first tapered portion 40 and a second straight portion 42. The first tapered portion 40 extends from the open end 24 through the opening 18 of the tubular housing 12. The second straight portion 42 extends from the end 44 of the first tapered portion 40. The second straight portion 42 is connected to the bell end 26 opposite to the first tapered portion 40. The second straight portion 42 has a diameter greater than the first tapered portion 40 and less than the diameter of the bell end 26. The air space 16 is formed between the second portion and an inner surface 46 of the housing 12. Additionally, the air space 16 also occurs between the outer surface of the first tapered portion 40 and the inner surface 46 of the tubular housing 12. The bell end 26 is tapered at 48 from the end of the second straight portion 42. It can be seen that the bell end 26 has an outer surface which is positioned in juxtaposition to the inner surface 46 of the housing 12. In FIG. 2, the flexible liner 14 has a material thickness which is less than the material thickness of the housing 12.

Figure 3:
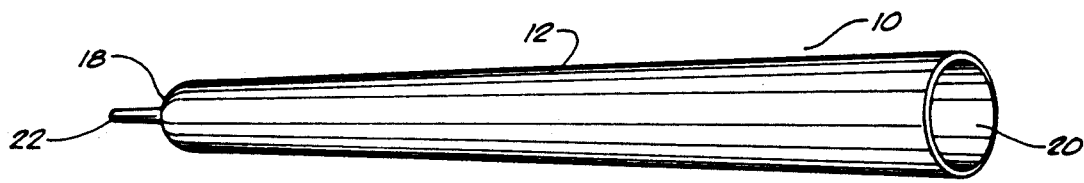
FIG. 3 is a perspective view of the turkey call of the present invention.

FIG. 3 is simply a general perspective view of the turkey call of FIGS. 1 and 2 showing the exterior configuration of the turkey call. In appearance, the turkey call 10 is very simple. It has the generally rigid tubular housing 12 which forms the body of the turkey call 10. In FIG. 3, it can be seen that a small portion 22 of the flexible liner 14 extends outwardly from the first end 18 of the housing 12. The second end 20 of housing 12 is provided opposite to the first end 18. The housing 12 is generally tubular and tapered from the small opening 18 to the large opening 20. As such, the housing 12 acts to amplify any sounds produced through the flexible liner 14. By the positioning of the bell end 26 within the housing 20, a great deal of amplification and tonal adjustment is created by the configuration of the present invention.

Figure 4:
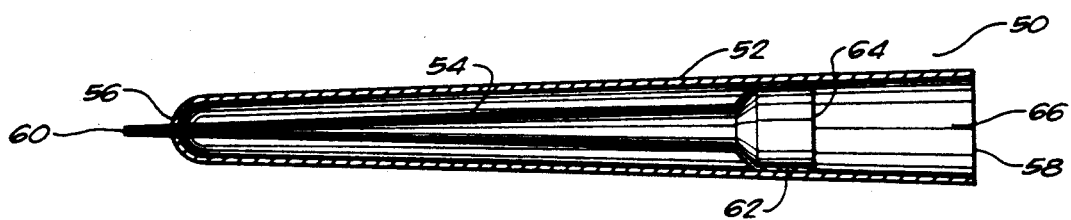
FIG. 4 is a cross-section view of an alternative embodiment of the turkey call of the present invention.

FIG. 4 shows an alternative embodiment 50 of the present invention. It can be seen that the alternative embodiment 50 has a housing 52 and a flexible liner 54. The flexible liner 54 is affixed within the interior of the housing 52. The outer housing 52 has a small first end opening 56 and a large second end opening 58. In general, the housing 52 of the alternative embodiment 50 has a configuration similar to the housings of FIGS. 1-3. However, depending upon the quality of the sound to be produced from the turkey call 50, the large open end 58 of housing 52 can be expanded so as to have a greater diameter than that shown in FIGS. 1-3. This device is configured so as to produce a lower pitch yelp, such as that of an old hen or gobbler.

The sound of the alternative embodiment 50 is accomplished by the special design of the flexible liner 54. Flexible liner 54 has a small open end 60 extending outwardly from the first end 56 of housing 52. The flexible liner 54 extends as a continuous taper from the end 60 to the bell housing 62. It can be seen that the bell end 62 is a larger bell than that shown in the previous embodiment. It has been found that the straight taper of the flexible liner 54, in combination with the larger bell 62 will produce a lower pitch yelp. The bell end 62 has a wide opening 64 through which sound can be emitted. The sound is emitted from opening 64 and passed through the central area 66 until the sound is emitted at end 58 of the housing 52. The materials used for the alternative embodiment of FIG. 4 are similar to the materials used for the preferred embodiment described in FIGS. 1-3.

With respect to the embodiments shown in FIGS. 1-4, it is possible to include several variations on the described embodiments within the scope of the present invention. With respect to the embodiment shown in FIGS. 1 and 2, it should be noted that the second straight portion 42 could also be formed so as to have a continuous taper from the end 44 of the first tapered portion 40 to the bell end 26. In addition, it is possible that the first tapered portion 40 could be relatively straight from end 24 to the end 44. In the embodiment shown in in FIG. 4, the tapered portion of the flexible liner 54 could be made of a relatively straight section within the interior of the housing 52. The straight section within the interior of housing 52 should taper downwardly so as to form the narrow opening 60 on the outwardly extending portion of the liner. These variations on the present invention should be considered within the scope of the present invention.

In either of the embodiments of the present invention, the turkey call is actuated by a "kissing" technique applied to the open end 24 of the flexible liner 14. This "kissing" technique does not take very long to master. The lips are simply pressed tight together so as to make a "kissing" sound. The small tip 22 of the turkey call 10 is then placed to the lips and the kiss is applied with suction. In order to control sound quality, the hand of the person can be cupped around the open end 20 of the housing 12. When the hand is cupped around this open end 20, a finger may be opened for long range sounds or closed for close-in sounds. In order to make a hen yelp sound, quick sharp kisses should be applied to the open end 24 on the tip 22.

The small mouthpiece of the present invention makes it extremely easy to use, in contrast with other wingbone-type calls. The consistency of the materials and the configuration of the present invention allow for an accurate reproduction of turkey sounds. The device of the present invention is made of tough polypropylene and polyethylene plastics. These materials enable the present invention to be used in a wide variety of weather conditions and allow the present invention a very long life.

The use of the three tier flexible liner allows the device to vibrate appropriately for a raspy sound. It is this raspy sound that has been extremely difficult to duplicate in conventional wingbone-type calls and other turkey call devices. The vibration of this three tier arrangement (the first tapered portion 40, the second straight portion 42, and the bell end 26) within air space 16 is an extremely unique configuration which unexpectedly produces a correct turkey sound. The configuration of the housing 12 is generally rigid so as to enhance, magnify, and amplify the sound for long range sound transmission. Tests have found that the sounds produced by the turkey call of the present invention can be heard at distances over one-half of a mile. The present invention is able to produce a wide variety of sounds. For example, the present invention can produce whines, cutts, kee-kee's, clucks, yelps, and cackles. The quality of the sounds produced by the present invention can be largely a function of the talent and ability of the user. By producing such a wide range of sounds, the present invention more accurately duplicates the natural sounds, and variations of sounds, of turkeys.

The present invention achieves the advantages of the wingbone-type calls without the difficulties associated therewith. In addition, the present invention produces a unique raspy sound which is not duplicated, in any way, by the wingbone-type calls. The present invention is generally a significant improvement over any prior art turkey call devices.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A turkey call comprising:
   a tubular housing having a first end and a second end, said first end having a smaller diameter than said second end, said tubular housing continuously tapered between said first end and said second end; and
   a flexible lining affixed within said housing such that an air space is formed between said housing and said lining, said lining having an open end adjacent said first end of said housing, said flexible lining having a bell end opposite said open end, said bell end having a diameter greater than a diameter of said open end, said flexible lining comprising:
   a first tapered portion extending from said open end to within said housing; and
   a second straight portion extending from said first tapered portion to said bell end, said second straight constant diameter, portion having a diameter greater than said first tapered portion, said air space formed between said second straight portion and an inner surface of said housing, said second straight portion being coaxial with said first tapered portion and extending longitudinally in said housing, said flexible lining having an unobstructed air passageway extending therethrough.

2. The turkey call of claim 1, said tubular housing comprised of a generally rigid polypropylene material.

3. The turkey call of claim 1, said flexible lining having said open end extending outwardly from said first end of said housing.

4. The turkey call of claim 1, said flexible lining having a material thickness of less than 1/16 of an inch.

5. The turkey call of claim 1 said housing having a second end opposite said first end, said bell end positioned within said tubular housing so as to be distal said second end of said housing.

6. The turkey call of claim 1, said bell end being tapered from an end of said second straight portion opposite said first tapered portion, said bell end having an outer surface corresponding to an inner diameter of said housing.

7. The turkey call of claim 4, said flexible lining comprised of a polyethylene material.

8. A turkey call comprising:
   a housing having a first end and a second open end, said first end having a smaller diameter than said second open end, said housing being a tapered tubular member; and a tubular flexible liner having a first tapered portion extending through said first end of said housing, said linear having a second straight, constant diameter, portion extending longitudinally and coaxially from said first tapered portion within said housing, said second straight portion having a diameter greater than said first tapered portion, said liner having a bell end extending from an end of said second straight portion opposite said first tapered portion, said bell end opening within said housing, said flexible liner affixed within said housing, said first tapered portion having an open end adjacent said first end of said housing, said open end having a smaller end than said bell end.

9. The turkey call of claim 8, said bell end tapered to said second straight portion, said bell end having an outer surface adhesively fastened to an inner surface of said housing, said bell end opening distal said second end of said housing.

* * * * *